Oct. 3, 1961  E. H. MATTHEWSON  3,002,695
WHEEL TYPE SPRAYER
Filed Aug. 8, 1958
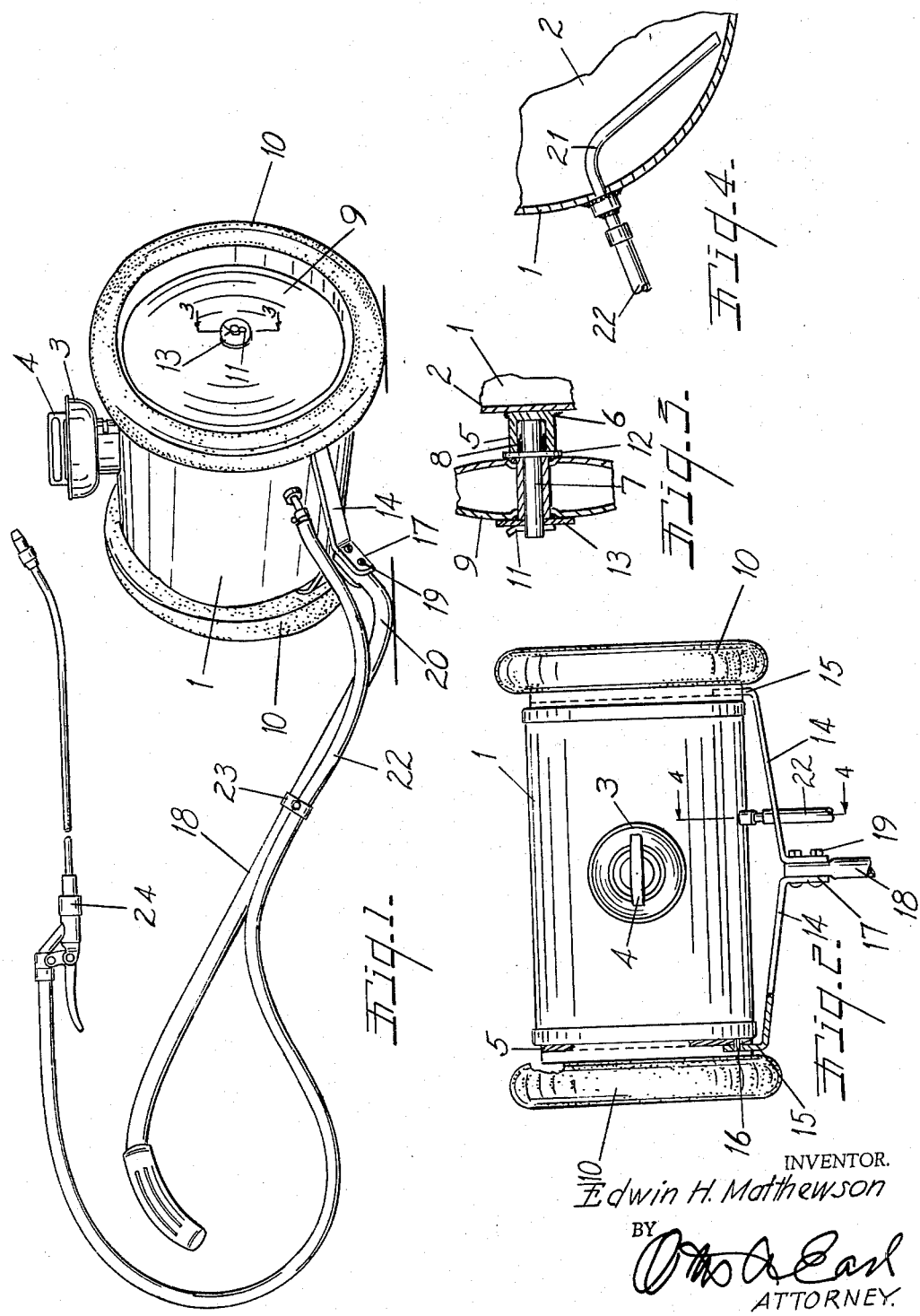
INVENTOR.
Edwin H. Matthewson
BY
Otto A. Earl
ATTORNEY.

3,002,695
Patented Oct. 3, 1961

3,002,695
WHEEL TYPE SPRAYER
Edwin H. Matthewson, Saranac, Mich., assignor to Universal Metal Products Company, Saranac, Mich.
Filed Aug. 8, 1958, Ser. No. 753,924
11 Claims. (Cl. 239—146)

This invention relates to a wheeled type manually manipulated mobile sprayer. The principal objects of this invention are:

First, to provide a mobile sprayer which is well adapted for use on rough ground and with a minimum of manual effort in proportion to the capacity of its tank.

Second, to provide a wheeled sprayer in which substantially the entire load or weight is supported by its two wheels.

Third, to provide a wheeled sprayer having these advantages which can be economically produced and is compact for storage and shipment.

Objects relating to details and economies of the invention will appear from the description to follow. The invention is defined and pointed out in the claims.

A preferred embodiment of the invention is illustrated in the accompanying drawing, in which:

FIG. 1 is a perspective view of a sprayer embodying my invention.

FIG. 2 is a plan view thereof with the handle and a hose partially broken away, certain parts being sectioned to illustrate the connection thereof.

FIG. 3 is an enlarged fragmentary view partially in a vertical section on a line corresponding to line 3—3 of FIG. 1.

FIG. 4 is a fragmentary view partially in section on a line corresponding to line 4—4 of FIG. 2.

In the embodiment of my invention illustrated the tank 1 is of cylindrical cross section and provided with flat parallel end walls 2. The tank is provided with a filling funnel 3 and with a pump 4, the handle only is illustrated. The details of the funnel and pump are not illustrated as they form no part of this invention and usable funnel and pump combinations are known in the art.

The end walls 2 of the tank have reinforcing and journal supporting bars 5 secured thereto. These being desirably of outwardly facing channel section as illustrated. These bars are fixedly secured to the end walls as by means of welds indicated at 6 in FIG. 3. The journals 7 are secured to these bars centrally relative to the tank by means of welds indicated at 8. The wheels 9 which are of a diameter exceeding the diameter of the tank are desirably of the disk type and provided with rubber tires 10. The wheels, as illustrated, are retained upon the journals by cotter pins 11. The journals are provided with inner thrust collars 12 and outer wheel retaining collars 13, see FIG. 3.

The handle yoke members 14 have outer end portions 15 which are secured to the ends of the bars 5 desirably being fixedly secured by welds 16. These yoke members converge at the side of the tank and have laterally turned ends 17 between which the inner end of the handle 18 is disposed and to which the handle is detachably secured by bolts 19.

The handle is provided with a downward offset 20 which constitutes a support member coacting with the wheels to support the tank in its upright rest position for filling and pumping operation.

The tank is provided with an eduction tube 21 depending into the tank and terminating adjacent at the bottom thereof. This eduction tube is connected to the handle side of the tank. The hose 22 is connected thereto and is supportedly connected at the handle 23 so that in minapulating the hose no stress is applied to the connection for the hose to the eduction tube.

The hose is provided with a valved discharge nozzle 24, details of which are not illustrated as they form no part of this invention.

The rubber tired wheels being journaled on the tank centrally thereof and carry the load of the tank and the sprayer may be pushed or pulled even over rough ground with relatively little effort. The operator is entirely relieved of the load when the handle is in ground engaging position and the operator is free to manipulate the spray nozzle as may be desired. The wheels are preferably of disk type and do not become clogged.

I have illustrated and described my invention in a highly practical embodiment thereof. I have not attempted to illustrate or describe other adaptations or modifications which I contemplate, as I believe this disclosure will enable those skilled in the art to embody or adapt my invention as may be desired.

Having thus described the invention what is claimed as new and desired to secure by Letters Patent is:

1. In a sprayer the combination of an elongated horizontally disposed tank of cylindrical section having flat and parallel end walls, horizontally disposed supporting bars fixedly secured to the ends of the tank, journals secured to said bars to project therefrom centrally relative to the tank, wheels of a diameter exceeding the diameter of the tank mounted on said journals, handle yoke arms mounted on said bars and converging at one side of the tank, a handle mounted on said arms and having a downward off-set therein adjacent the arms constituting a support engaging member, said tank being provided with a filling opening, a pressure pump, an eduction conduit, and a hose connected to said eduction conduit and supportedly connected to said handle in spaced relation to its connection to said eduction tube.

2. In a sprayer the combination of an elongated horizontally disposed tank of cylindrical section having flat and parallel end walls, horizontally disposed supporting bars fixedly secured to the ends of the tank, journals secured to said bars to project therefrom centrally relative to the tank, wheels of a diameter exceeding the diameter of the tank mounted on said journals, handle yoke arms of the tank mounted on said bars and converging at one side of the tank, a handle mounted on said arms, said tank being provided with a filling opening, a pressure pump, an eduction conduit, and a hose connected to said eduction conduit.

3. In a sprayer the combination of an elongated horizontally disposed tank of cylindrical section, journals connected to said tank to project centrally from the ends thereof, wheels of a diameter exceeding the diameter of the tank mounted on said journals, a handle connected to said tank and having a downward off-set therein adjacent the tank constituting a support engaging member, said tank being provided with a filling opening, a pressure pump, an eduction conduit depending into said tank and projecting therefrom above said handle, and a hose connected to said eduction conduit and supportedly connected to said handle in spaced relation to its connection to said eduction tube.

4. In a sprayer the combination of a tank, journals secured to said tank to project oppositely therefrom, wheels of a diameter exceeding the diameter of the tank mounted on said journals, handle yoke arms connected to the ends of the tank and converging at one side thereof, a handle mounted on said arms and having a downward projection adjacent the arms constituting a support engaging member for supporting the tank in upright position, said tank being provided with a filling opening, a pressure pump, an eduction conduit, and a hose connected to said eduction conduit and supportedly connected to said handle in spaced relation to its connection to said eduction tube.

5. In a sprayer the combination of a tank, journals secured to said tank to project oppositely therefrom, wheels of a diameter exceeding the diameter of the tank mounted on said journals, handle yoke arms connected to the ends of the tank and converging at one side thereof, a handle mounted on said arms, said tank being provided with a filling opening, a pressure pump, an eduction conduit depending into said tank and projecting therefrom above said handle, and a hose connected to said eduction conduit and supportedly connected to said handle in spaced relation to its connection to said eduction tube.

6. In a sprayer, the combination of a tank of cylindrical cross section disposed horizontally, journals fixedly connected to the said tank to project from the ends thereof, wheels of a diameter exceeding the diameter of said tank mounted on said journals, a rigid handle disposed centrally of and to project sidewise from said tank and provided with arms connected to the ends of said tank at the inner sides of said wheels, said tank being provided with a filling opening and said handle being provided with a support engaging portion coacting with said wheels to support the tank in upright position with its said filling opening facing upwardly, a pressure pump discharging into said tank, an eduction conduit depending into said tank and projecting therefrom above and adjacent to said handle, and a hose connected to said eduction conduit and having a portion thereof supportedly connected to said handle at the outer side of the connection of the hose to said eduction conduit.

7. In a sprayer, the combination of a tank of cylindrical cross section disposed horizontally, journals fixedly connected to the said tank to project from the ends thereof, wheels of a diameter exceeding the diameter of said tank mounted on said journals, a rigid handle disposed centrally of and to project sidewise from said tank and fixedly connected thereto, said tank being provided with a filling opening and said handle being provided with a support engaging portion coacting with said wheels to support the tank in upright position with its said filling opening facing upwardly, a pressure pump discharging into said tank, an eduction conduit depending into said tank and projecting therefrom above and adjacent to said handle, and a hose connected to said eduction conduit and having a portion thereof supportedly connected to said handle at the outer side of the connection of the hose to said eduction conduit.

8. In a sprayer, the combination of a tank of cylindrical cross section disposed horizontally, journals secured to said tank to project outwardly from the ends thereof, wheels of a diameter exceeding the diameter of the tank mounted on said journals, handle yoke arms having inner portions disposed between said wheels and the ends of the tank and fixedly secured to the tank and having outer converging portions at one side of the tank, a handle mounted on said converging portions of said arms and having a downwardly projecting offset therein constituting a support coacting with wheels in supporting the tank in upright rest position, a pressure pump mounted on and discharging into said tank, and a manually manipulatable discharge hose connected to said tank and provided with a manually controlled discharge nozzle at its outer end.

9. In a sprayer, the combination of a tank of cylindrical cross section disposed horizontally, journals secured to said tank to project outwardly from the ends thereof, wheels of a diameter exceeding the diameter of the tank mounted on said journals, handle yoke arms having inner portions disposed between said wheels and the ends of the tank and fixedly secured to the tank and having outer converging portions at one side of the tank, a handle mounted on said converging portions of said arms and having a support portion coacting with wheels in supporting the tank in upright rest position, a pressure pump mounted on and discharging into said tank, and a manually manipulatable discharge hose connected to said tank and provided with a manually controlled discharge nozzle at its outer end.

10. In a sprayer, the combination of a tank, journals secured to the tank to project oppositely from the ends thereof, wheels of a diameter exceeding the diameter of the tank mounted on said journals and disposed closely adjacent the ends of the tank, handle yoke arms disposed between said wheels and the ends of the tank and fixedly connected to the ends of the tank, said arms having an outer end portion converging at one side of the tank, a handle mounted on said converging end portions of said arms, a pressure pump mounted on and discharging into said tank, and a manually manipulatable discharge hose connected to said tank and provided with a manually controlled discharge nozzle at its outer end.

11. In a sprayer, the combination of a tank, journals secured to the tank to project oppositely from the ends thereof, wheels of a diameter exceeding the diameter of the tank mounted on said journals and disposed closely adjacent the ends of the tank, handle yoke arms disposed between said wheels and the ends of the tank and fixedly connected to the ends of the tank having end portions projecting laterally from the tank, a handle mounted on said projecting end portions of said arms, a pressure pump mounted on and discharging into said tank, and a manually manipulatable discharge hose connected to said tank and provided with a manually controlled discharge nozzle at its outer end.

References Cited in the file of this patent

UNITED STATES PATENTS

| 581,416 | Dunn | Apr. 27, 1897 |
| 965,623 | Douglass | July 26, 1910 |
| 1,057,616 | Booz et al. | Apr. 1, 1913 |
| 1,724,702 | Flickinger | Aug. 13, 1929 |
| 1,915,124 | Ernst | June 20, 1933 |
| 2,550,384 | Senne | Apr. 24, 1951 |
| 2,661,982 | Hudson | Dec. 8, 1953 |
| 2,730,857 | Myers | Jan. 17, 1956 |
| 2,778,447 | Meyerhoefer | Jan. 22, 1957 |
| 2,784,030 | Dietzel | Mar. 5, 1957 |
| 2,818,299 | Payne | Dec. 31, 1957 |

FOREIGN PATENTS

| P11,799III/45f | Germany | Oct. 27, 1955 |
| 2,630 | Great Britain | July 9, 1877 |
| 355,046 | Great Britain | Aug. 20, 1931 |